Dec. 12, 1967   N. D. STEPHENSON   3,357,759
BEARINGS
Filed Feb. 23, 1965   2 Sheets-Sheet 1
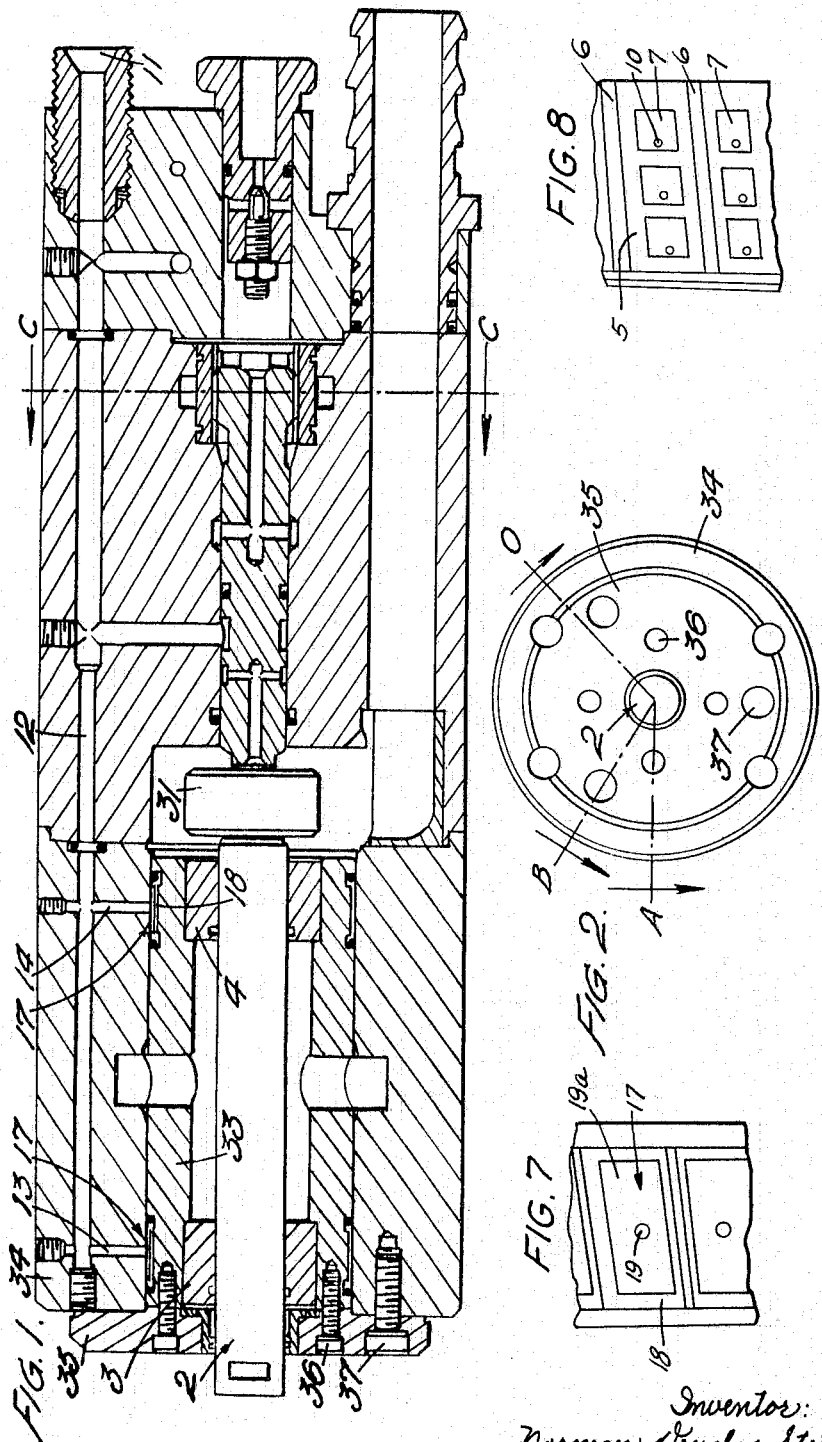
Inventor:
Norman Douglas Stephenson
BY Baldwin & Wight
Attorneys

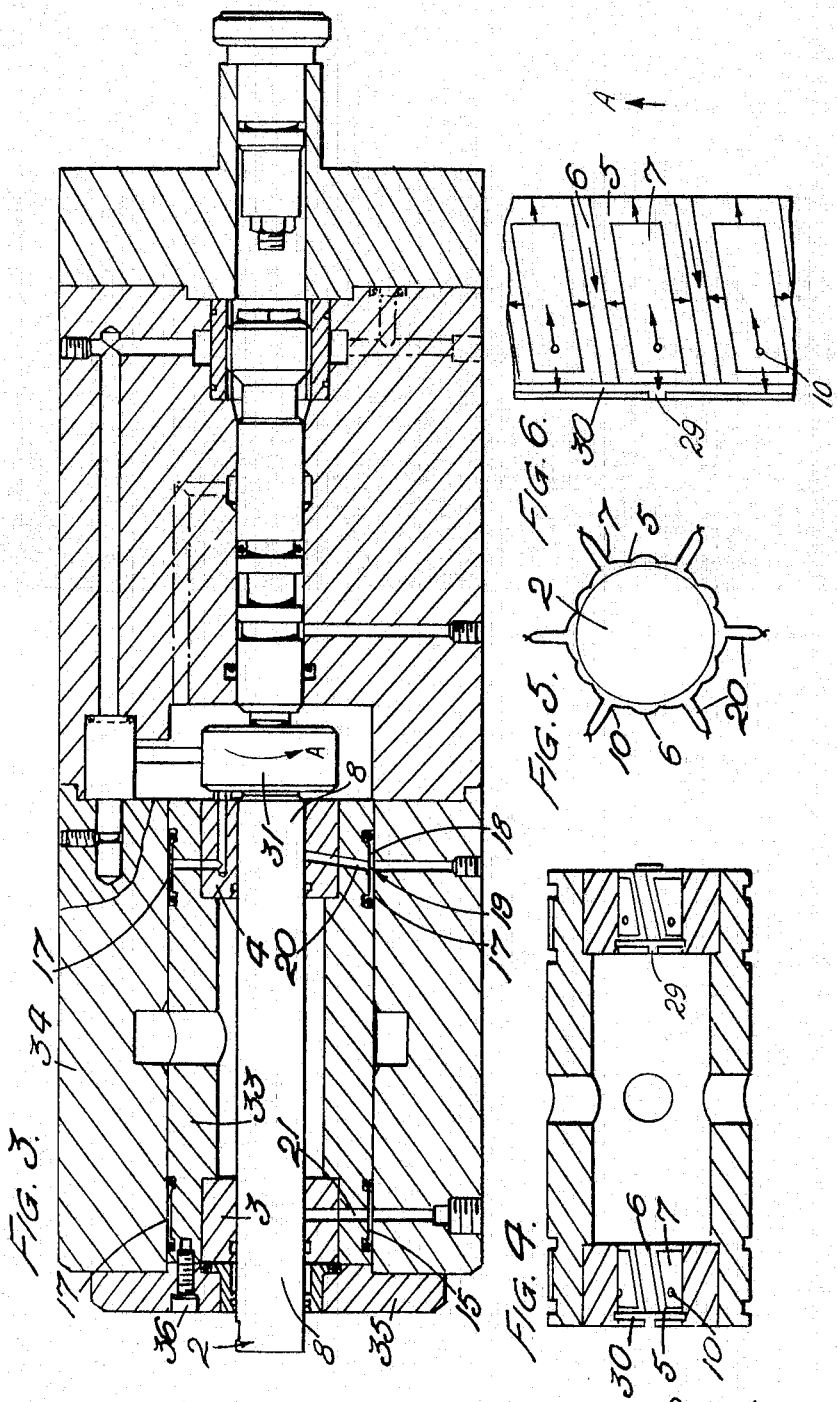

United States Patent Office 3,357,759
Patented Dec. 12, 1967

3,357,759
BEARINGS
Norman Douglas Stephenson, Wonersh, England, assignor to Servomatic Hydraulics (Guildford) Limited, Godalming, Surrey, England, a British company
Filed Feb. 23, 1965, Ser. No. 434,454
11 Claims. (Cl. 308—122)

ABSTRACT OF THE DISCLOSURE

A hydrostatic bearing is provided for maintaining a rotor disposed therein, in a floating state. The bearing utilizes pads over which fluid flows between the pad and rotor portions, the fluid being provided to the pads through recesses in the pads, and particularly through holes at one end of each of the recesses. The pads are of generally parallelogram configuration, and are angularly disposed such that fluid flows through a pad recess in a direction having a motion component in the direction of rotation of an adjacent rotor portion, to reduce frictional drag of the fluid. A metering device is provided for distributing fluid to each of the pads, the device also including pressure pads, and having the same general configuration as the bearing described above.

---

This invention relates to an improved form of hydrostatic bearing.

A hydrostatic bearing, which will hereinafter be called "of the kind described," is one that is capable of holding, in a floating state, a rotor journalled therein and comprises a number of pressure pads placed symmetrically around the circumference of the bearing surface of the journal, the pads being separated from the rotor by a fluid and from each other by exhaust channels, and means by which fluid under pressure may be fed into the bearing via a restrictor so that it can flow between the surface of the rotor and the pressure pads into the exhaust channels, the surface of the rotor lying close to the surface of the pressure pads to cause a resistance to the flow of fluid whereby if the rotor is deflected within the bearing the clearance between the rotor and the bearing on the side to which the rotor is deflected, is reduced thus causing an increase in resistance to the flow of fluid which in turn causes an increase in pressure on that side, but on the other side of the rotor the resistance to the flow of fluid and hence the pressure is reduced thus causing a differential pressure across the bearing which in turn provides a restoring force which opposes the force deflecting the rotor.

According to the invention we provide a hydrostatic bearing of the kind described in which there are at least three pads each extending in a direction oblique to the axis of the bearing (e.g. helically).

It is preferred that the pressure pads are all of the same size and shape. It is also preferred that the path of the pressure pads extends uniformly along the length of the bearing surface, each pad being parallel to its adjacent pad or pads.

Preferably the fluid entering the bearing first flows into a recess, provided in the surface of each pressure pad, before it flows between the pad and the rotor into an exhaust channel, the recesses being formed so that the width of pad remaining on opposite sides of the recess is uniform. There may be more than one recess in each pressure pad, each recess having a separate in-flow of fluid. Preferably the fluid is fed into each recess at one end thereof, the end being such that the flow of fluid within the recess has a component in the same direction as the forward path of the pressure pad and the direction of rotation of the rotor. In a case where each recess is fed from the end just defined the flow of fluid produces a force tending to rotate the rotor and thus cause a reduction of the fluid drag when the rotor is driven.

Preferably the flow of fluid into the bearing is restricted by a metering device, which device may be designed such that the flow characteristics of the fluid passing therethrough are the same as for the fluid passing between the surface of a pressure pad and the surface of the rotor since this results in a controlled pressure of fluid entering the bearing. The metering device may comprise two closely spaced surfaces, on one side of the gap defined by those two surfaces there being a passageway from the supply of pressure fluid and on the other side there being a passageway to the bearing. Preferably there is a separate metering device provided for each inlet to the bearing, each metering device being substantially identical and having a passageway leading from preferably the same supply of fluid. The metering device may be such that the gap defined by the two surfaces is fixed or adjustable to suit any particular requirements. The metering device may be regarded as stationary replicas of the bearing pads and their adjacent rotor surfaces and exhaust passages. A preferred form of the invention provides a bearing of the kind described in which a number of pressure pads extend helically along the whole length of the bearing surface, and which are spaced by a number of exhaust channels running parallel to the pressure pads, each pressure pad having a number of recesses provided symmetrically along the length of each pad and positioned such that the width of pad remaining on opposite sides of the recess is the same, each recess having a separate supply of fluid, the fluid flowing into each recess through an inlet provided at one end of that recess, that end being such that the flow of fluid within the recess has a component in the same direction as the forward turn of the helical path of the pressure pad and the direction of rotation of the rotor, and in which the flow of fluid to each recess is passed through a metering device or means for restricting its flow, the device being such that the flow of fluid passes through a gap defined by two surfaces, the flow characteristics of the fluid passing therethrough being closely similar to those for the fluid passing between the surface of the pressure pads and the surface of the rotor.

By way of example an improved hydrostatic bearing constructed in accordance with the invention will now be described with reference to the accompanying drawings in which:

FIGURE 1 is a sectional elevation of the bearing;
FIGURE 2 is an elevation of the left-hand end of the bearing with respect to FIGURE 1;
FIGURE 3 is a sectional elevation of the bearing, the left part being along the line A–O in FIGURE 2 and the right part being along the line B–O in FIGURE 2;
FIGURE 4 is a sectional elevation of the stator and the journals of the bearing of FIGURE 1;
FIGURE 5 is a cross-section of one of the bearing surfaces showing the adjacent surfaces of the rotor and the journal of the bearing shown in FIGURES 1 to 3; and
FIGURE 6 is a developed view of the bearing surface of each journal shown in FIGURES 4 and 5 to show the helical pads of each bearing surface.
FIGURE 7 is a view similar to that of FIGURE 6, illustrating the metering device of this invention.
FIGURE 8 is a view of a modified form of bearing surface wherein more than one recess is provided in each pressure pad.

With reference to the drawings, the hydrostatic bearing 1 comprises a rotor 2 and two journals 3, 4, the rotor being driven by a drum 31 operated by a turbine. A stator 33, within which the journals 3, 4 are mounted, is itself mounted within a housing 34 and held therein by means of an end cap 35. Screws 36, 37 pass through the end cap 35 into the stator 33 and the housing 34. By this arrangement it is possible to readily remove the bearing assembly from its housing.

The bearing surface of each journal is built up of a number of pressure pads 5 (see FIGURES 4 to 6) placed symmetrically around the bearing surface and extending helically along the length of the bearing surface. The pressure pads 5 are separated by helically extending exhaust channels 6 and each pad has a recess 7 defined by pad edge portions which define a parallelogram configuration, the bearing surface being such that fluid fed under pressure into one of the recesses 7 will flow over the pressure pad 5 surrounding the recess into each of the two exhaust channels 6 running alongside the particular pad 5 and onto a circumferential exhaust channel 30 with exhaust port 29. Inside each journal rotates the rotor 2, the surface of which is accurately machined to allow for the required bearing clearance between the surface of the rotor and each pressure pad 5. If desired only the end portions 8 of the rotor, which comprise the bearing surfaces of the rotor, need be so accurately machined. In such a case the rotor may have a central portion which has a smaller diameter than the said bearing portions 8.

In one end of each recess 7, the end being the same for each recess in both journals, is an inlet orifice 10 through which is passed a continuous flow of fluid at a predetermined and controlled pressure, the end provided with the inlet 10 being such that the flow of fluid along the recess has a component in the same direction as the forward path of the pressure pad and the direction of the rotor (see FIGURE 6).

The fluid first enters the bearing housing through an inlet 11. The fluid is then passed by means of ducts 12, 13, 14 into one of two elongated channels 17 which are provided in the housing, one being at a point near to the journal 3 and the other being at a point near the journal 4, the channels being co-axial with the rotor so that the fluid may be conveniently fed from these channels to each recess 7 provided in the two journals.

It is at these points that the flow of fluid is restricted in order to accurately control the pressure of the fluid entering the recess 7. The means used in this example for restricting the flow of fluid is termed a metering device, a separate device being provided for each journal. Each channel 17 defines a number of islands 18. The number of islands 18 depends on the number of recesses 7 provided in the bearing surface of the journal 3. Each island comprises a surface that is rebated at 19a to allow a small clearance between that surface and the adjacent surface of the housing, and is also provided with a recess or hole 19 which is connected by ducts 20, 21 to one of the recesses 7. It is thus possible for fluid to flow from the channels 17 over the surface of each island 18 down the hole 19 and thus pass into one of the recesses 7 through a duct 20 or 21. The size of the clearance between each island and the adjacent surface of the housing is predetermined so that the flow of fluid will be restricted to a definite extent. It may be desirable, however, to provide islands which comprise plates or rings that are adjustable so that the clearance can be adjusted and so that the rate of flow can be adjusted to suit any particular requirement.

An advantage of this form of metering device is that the periphery of each island 18 acts as an edge filter. The clearance can be made the same or smaller than the bearing clearance and thus particles that would otherwise damage the bearing are held back. Another advantage is that the flow of fluid to each recess or pool can be made equal. This factor is very beneficial in that it ensures that the rotor is held in a central position relative to the journal and thus it is possible to use smaller bearing clearances. Smaller clearances in turn increase the stiffness of the bearing, that is a greater load is required to deflect the rotor a given amount.

In operation the fluid passing along the recesses will effect a viscous drag on the rotor. Due to the pressure pads extending helically throughout the length of the journal the drag will have both axial and tangential components. If the direction of the helix and the position of the inlet orifice 10 is as shown in FIGURE 6, the tangential component of the drag can be made to rotate the rotor and thus if the direction of rotation of the rotor is in the direction shown by the arrow A (FIGURES 3 and 6) a reduction in fluid drag will result when the rotor is driven. This reduction in fluid drag enables higher speeds to be obtained and reduces power input for a given speed of rotation. It should be realised that the magnitude of this tangential component depends upon the angle of the helix.

I claim:

1. In a hydrostatic bearing which is capable of holding, in a floating state, a rotor journalled therein and which comprises at least 3 pressure pads defined by edges of parallelogram configuration placed symmetrically around the circumference of the bearing surface of a journal, each pad having a central recess also defined by edges of parallelogram configuration, the pads being separated from the rotor by a fluid and from each other by exhaust channels, and inlet means in each recess by which fluid under pressure may be fed into the journal via a restrictor so that it can flow between the surface of the rotor and the pressure pads into the exhaust channels, each pad extending in a direction oblique to the axis of the bearing in helical disposition.

2. A hydrostatic bearing for holding a rotor journalled therein, in a floating state comprising a plurality of pressure pads defined by edges of parallelogram configuration disposed about a journal bearing surface, the pads being separated from each other by exhaust channels, each pad having a recess therein of parallelogram configuration fully outlined by pressure pad portions, a fluid inlet disposed within each recess near one axial end thereof, and wherein the pads extend helically in respect of the axis of the bearing.

3. A bearing as claimed in claim 1 in which the pressure pads are all of the same size.

4. A bearing as claimed in claim 1 in which the path of the pressure pads extends uniformly along the length of the bearing surface, each pad being parallel to its adjacent pads.

5. A bearing as claimed in claim 1 in which the rotor is disposed in the journal such that the fluid entering the bearing first flows into each recess before it flows between the pad and the rotor into the exhaust channels, the recesses being formed so that the width of pad remaining on opposite sides of the recess is uniform and equal.

6. A bearing as claimed in claim 5 in which there is more than one recess in each pressure pad, each recess having a spearate in-flow of fluid.

7. A bearing as claimed in claim 4 in which the fluid is fed into each recsss at one end thereof, the end being such that the flow of fluid within the recess has a component in the same direction as the forward path of the pressure pad and the direction of rotation of the rotor.

8. A bearing as claimed in claim 1 in which the flow of fluid into the bearing is restricted by a metering device, which device is designed with opposed surfaces having a gap therebetween such that the flow characteristics of the fluid passing therethrough are the same as for the fluid passing between the surface of a pressure pad and the surface of the rotor since this results in a controlled pressure of fluid entering the bearing.

9. A bearing as claimed in claim 8 in which the metering device comprises two closely spaced surfaces, on one side of the gap defined by those two surfaces there being a passageway from the supply of pressure fluid and on the other side there being a passageway to the bearing.

10. A bearing as claimed in claim 8 in which there is a separate metering device provided for each inlet to the bearing, each metering device being substantially identical and having a passageway leading from preferably the same supply of fluid.

11. In a hydrostatic bearing which is capable of holding, in a floating state, a rotor journalled therein and which comprises a number of pressure pads placed symmetrically around the circumference of the bearing surface of a journal, the pads being separated from the rotor by a fluid and from each other by exhaust channels, and means by which fluid under pressure may be fed into the bearing via a restrictor so that it can flow between the surface of the rotor and the pressure pads into the exhaust channels, the pressure pads extending helically along the entire length of the bearing surface, the exhaust channels which separate the pads running parallel to the pressure pads, each pressure pad having at least one recess provided symmetrically along the length of each pad and positioned such that the width of pad remaining on opposite sides of the recess is the same, each recess being of parallelogram configuration and having a separate supply of fluid, the fluid flowing into each recess through an inlet provided at one end of that recess, that end being such that the flow of fluid within the recess has a component in the same direction as the forward turn of the helical path of the pressure pad and the direction of rotation of the rotor, and in which the flow of fluid to each recess is passed through a metering device, the device being such that the flow of fluid passes through a gap defined by two surfaces, the flow characteristics of the fluid passing therethrough being closely similar to those for the fluid passing between the surface of the pressure pads and the surface of the rotor.

References Cited

UNITED STATES PATENTS

| 2,578,711 | 12/1951 | Martellotti | 308—122 |
| 2,660,484 | 11/1953 | Gerald et al. | |
| 2,822,223 | 2/1958 | Offen | 308—122 |
| 3,193,337 | 7/1965 | Levesque et al. | 308—122 |
| 3,240,541 | 3/1966 | Levesque | 308—132 |

FOREIGN PATENTS 15,911   4/1912   Denmark.

MARTIN P. SCHWADRON, *Primary Examiner.*

FRANK SUSKO, *Examiner.*